Figure 1:
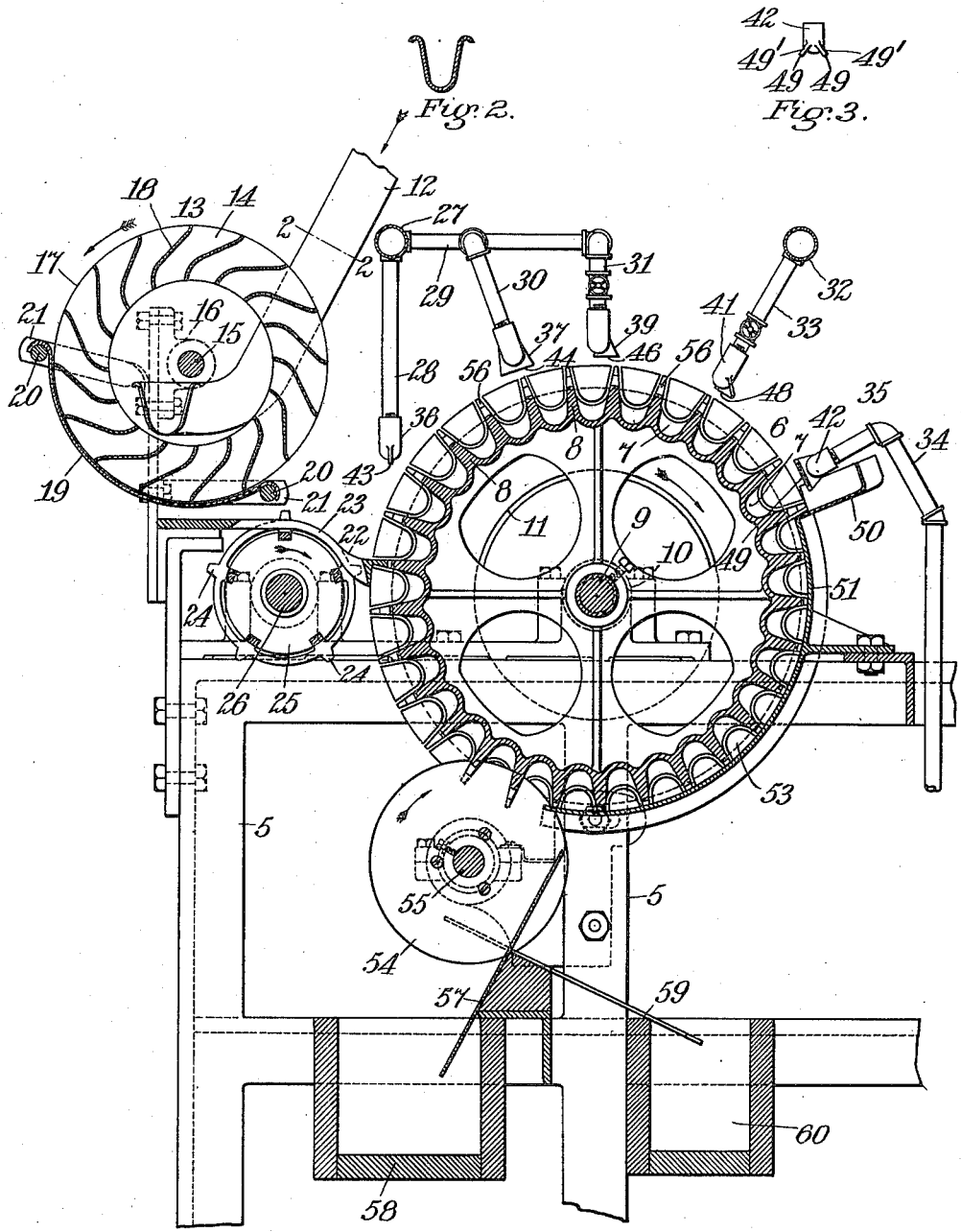

F. D. CLEVELAND.
MACHINE FOR HANDLING AND CUTTING FISH.
APPLICATION FILED DEC. 13, 1911.

1,030,646.

Patented June 25, 1912.

2 SHEETS—SHEET 1.

WITNESSES

INVENTOR

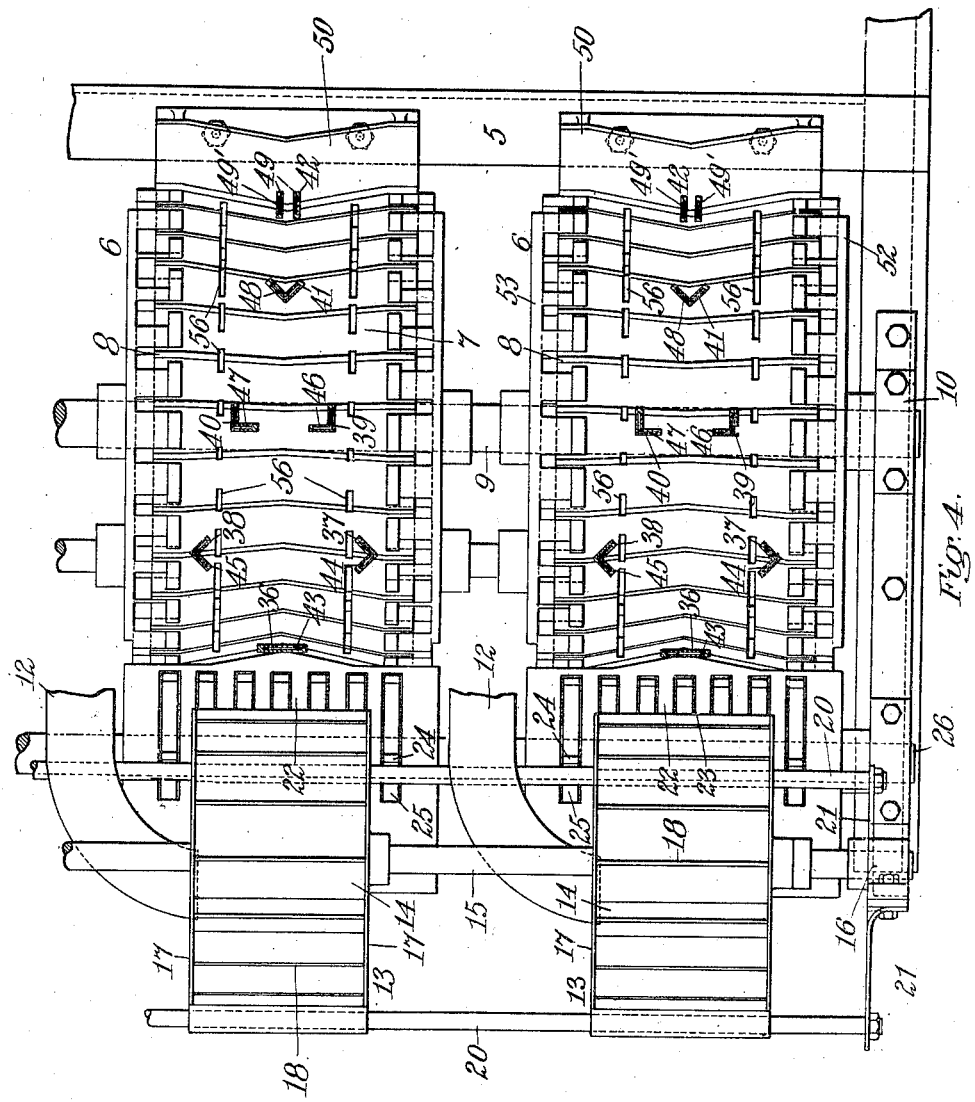

UNITED STATES PATENT OFFICE.

FRANCIS D. CLEVELAND, OF WINCHESTER, MASSACHUSETTS.

MACHINE FOR HANDLING AND CUTTING FISH.

1,030,646.   Specification of Letters Patent.   Patented June 25, 1912.

Application filed December 13, 1911. Serial No. 665,435.

*To all whom it may concern:*

Be it known that I, FRANCIS D. CLEVELAND, a citizen of the United States, residing at Winchester, in the county of Middlesex and State of Massachusetts, have invented new and useful Improvements in Machines for Handling and Cutting Fish, of which the following is a specification.

This invention relates to mechanism for handling fish and for cutting off the heads and tails of said fish, such, for instance, as the fish known as "sardines" preparatory to canning the same.

The invention consists in the combination and arrangement of parts set forth in the following specification and particularly pointed out in the claims thereof.

The mechanism hereinafter described is an improvement upon the machine for which I have made application for Letters Patent filed July 23, 1910, Serial No. 573,515, machine for cutting off heads and tails of fish, and so far as the carrier for presenting the fish to the rotary cutters, whereby the heads and tails are cut off of said fish, is concerned, and the location and operation of the cutters themselves and the rotary feed member for moving the fish along a slotted guide into the pockets of the rotary carrier, the two mechanisms are substantially the same. The present mechanism, however, differs from the mechanism in said application in the improved means for delivering the water into the pockets of the carrier for the purpose of locating the fish with their heads against the gages at opposite ends of the pockets in said carrier, and, furthermore, the improvement consists in the rotary segregator and the means for delivering the fish to said segregator prior to the same being delivered into the pockets of the carrier by the rotary feed member.

Referring to the drawings: Figure 1 is a vertical sectional elevation of my improved machine for handling and cutting fish. Fig. 2 is a detail section taken on line 2—2 of Fig. 1. Fig. 3 is a detail side elevation of one of the nozzles, whereby streams of water are delivered into the pockets of the carrier. Fig. 4 is a plan view, partly broken away, of the machine, the nozzles of the water conveyers being shown in section and the water conveyers or pipes which conduct the water to said nozzles not being shown.

Like numerals refer to like parts throughout the several views of the drawings.

In the drawings, 5 is the frame of the machine and 6, 6 are rotary carriers, each provided with pockets 7, 7 in the periphery thereof for the reception of the fish from which the heads and tails are to be removed. Said pockets are separated one from the other by partitions 8, 8 extending longitudinally of the carriers 6, 6. The carriers are substantially duplicates of each other and each is fastened to a shaft 9 journaled in suitable bearings 10 on the frame of the machine. The carrier is rotated in any suitable manner as, for instance, by a pulley 11 fast to the shaft 9.

The fish are delivered to the machine through chutes 12, 12 (Figs. 1 and 2.) These chutes are preferably U-shaped in cross section and extend downwardly at an angle, their outlet ends being arranged adjacent to the segregators 13, 13 and delivering the fish in a direction longitudinally of the pockets 14, 14 provided in said segregators and at the inner ends of said pockets. It will be understood that the segregators 13, 13 and the carriers 6, 6 and the mechanism whereby the fish are fed from the segregators to the carriers as well as the means for delivering the water to the peripheries of the carriers are substantially the same. Therefore, the following description, while confined to a single set of instrumentalities, will apply equally to each and to both of the two sets of fish handling and cutting mechanisms.

The segregator 13 is fastened to a shaft 15 and is rotated by suitable mechanism such as a pulley. The shaft 15 is journaled to rotate in bearings 16 fast to the frame of the machine. Said segregator consists of two side plates or flanges 17, 17 forming the ends of the pockets 14, 14, and said pockets are separated one from the other by radially disposed walls 18, 18 which are of ogee curvature in cross section. A stationary shield 19 is supported upon rods 20, 20 fast to brackets 21, 21 which, in turn, are fastened to the frame of the machine. A curved guide 22 is provided located beneath and adjacent to the lower end of the shield 19 and is provided with slots 23, 23 through which fingers 24, 24 upon the periphery of a rotary feed member 25 project, said feed member being fastened to a shaft 26 to which a rotary motion is imparted by suitable mechanism (not shown in the drawings), such as a pulley.

A plurality of pipes 27, 28, 29, 30, 31, 32, 33, 34 and 35 feed water to a plurality of nozzles 36, 37, 38, 39, 40, 41 and 42. These nozzles are arranged at different points around the periphery of the carrier 6 and are arranged in different positions relatively to the ends of the pockets in said carrier and in different positions and at different angles relatively to each other. Each of these nozzles is provided with an outlet orifice which is elongated transversely thereof and constitutes, in effect, a slot, whereby a flattened stream of water is directed into the pockets of the carrier, the pipe being arranged so as to deliver this water at an angle to the length of the pockets.

The nozzle 36 (Figs. 1 and 2) has screw-threaded engagement with the pipe 28, so that it may be turned at different angles thereon, but is preferably arranged with the length of its outlet orifice or slot 43 extending longitudinally of the pockets 7 in the carrier 6. As will be seen by reference to Fig. 4, this nozzle 36 is located substantially midway between the ends of the pockets. The nozzles 37 and 38 have screw-threaded engagement with pipes 30, 30 which are connected to the pipe 29 and said pipes 28 and 29 are both connected to a main supply pipe 27, so that the nozzles 37 and 38 can be rotated to assume different positions by turning the same upon the pipes 30, 30. These nozzles are preferably, however, arranged as shown in Fig. 4, and the outlets of said nozzles consist of V-shaped slots 44 and 45, respectively. It will be noted that the nozzles 37 and 38 are placed near the opposite ends of the pockets 7, with the apices of the slots 44 and 45 directed outwardly or toward opposite ends, respectively, of said pockets. The nozzles 39 and 40 are each provided with V-slots 46 and 47, respectively, and these nozzles are placed about midway between the ends of the pockets and the centers thereof and preferably with the V-slots located at different angles to the median transverse plane of the carrier from the angle at which the slots 44 and 45 are set relative to said median transverse plane. The nozzle 41 is preferably located midway between the ends of the pockets and is provided with a V-slot 48 which is preferably set in such a position that said slot will be bisected by said median transverse plane. The nozzle 42 has two slots 49, 49 at the outlet end thereof, these slots being located at the outlet ends of two branches 49', 49' of the nozzle 42.

A tray 50 is located at the right of the carrier 6, and extending downwardly from beneath said tray to the bottom of the carrier is a shield 51 concentric with said carrier and adjacent to the periphery thereof. To the lower end of the shield 51 are preferably connected two pipes and adjacent to the outlet ends of said pipes is a deflecting plate which deflects the water in opposite directions from the center of the carrier toward the outside thereof and in a direction substantially parallel to the inner face of the shield. These pipes are not shown in the drawings, but are fully described in said application for Letters Patent. They are preferable, but not essential to the operation of this mechanism.

The opposite ends of the pockets 7, 7 are substantially closed, to prevent the fish from being driven out of the pockets by the flow of the water, by annular gages 52 and 53, these gages being fastened to the shaft 9 and adjustable longitudinally of said shaft to accommodate varying lengths of fish, according to the size fish that is handled by the machine.

A pair of rotary cutters 54 are fastened to a shaft 55 journaled in suitable bearings on the frame of the machine and are rotated by any suitable mechanism, such, for instance, as a pulley (not shown in the drawings). These rotary cutters project into the pockets 7, 7 as the carrier rotates and extend transversely of said pockets.

The partitions 8, 8 are provided with slots 56, 56 to allow the cutters to project into said pockets and these slots are in alinement with the rotary cutters 54, 54. The fish bodies pass between the cutters 54, 54 after having the heads and tails cut therefrom and drop onto a chute 57, down which they slide into a chute 58, and are then conveyed along said chute 58 by means of the water to any desired receptacle. The heads and tails which are cut from the fish bodies pass on the outside, respectively, of the rotary cutters and onto two chutes 59 located outside said cutters, and said heads and tails pass down the two chutes 59 and into a receptacle 60.

The general operation of the machine hereinbefore specifically described is as follows: The different rotary members rotate in the direction of the arrows placed thereon in Fig. 1. Fish are carried down the inclined chute 12 in a stream of water and are delivered by said chute in a direction longitudinally of the pockets 14 of the segregator 13 and at the inner ends of said pockets, the outlet of said chute 12 being located near the pockets adjacent to the pockets at the lower side of the segregator 13. As the segregator 13 is rotated in the direction of the arrow thereon (Fig. 1), the fish slide down the ogee-shaped walls 18 of the pockets 14, and, by reason of this peculiar shape of the walls, are alined with their bodies extending longitudinally of the pockets or substantially parallel to the shaft 15. Said fish finally slide down into contact with the inner face of the shield 19 and are pushed by the outer ends of said walls 18 along said shield and over the lower end thereof onto the curved guide 22. The fingers 24 take the fish at this point and move them sidewise along the guide 22 and into the pockets 7 in the carrier 6; said carrier rotating in the direction of the arrow thereon carries the fish around in the pockets beneath the various nozzles adjacent to the outlet slots thereof.

It will be understood that when the fish are delivered to the carrier, there may be one, two or three delivered to a single pocket; they may be delivered with their heads all pointing one way, or they may be delivered in various positions, as, for instance, the fish may lie longitudinally within the pockets or they may extend transversely of the pockets. It is, however, the object of the invention to have the fish lie longitudinally of the pockets with their heads against the annular gages 52, 53, as the case may be, in order that when the heads and tails are cut from the fish they shall be cut at the proper point and not spoil the fish by cutting the same in the wrong place. Therefore, as the rotary carrier 6 is rotated from the point at the left where the fish are first fed into the pockets by the feed fingers 24, 24, they are carried up and first come into contact with the flattened stream of water delivered by the slotted end 43 of the nozzle 36. This stream of water serves to remove any fish which may lie transversely of the pockets and outside the periphery of the carrier and such fish will be forced off of the wheel by the stream from the nozzle 36 and will fall back onto the guide plate 22 by the flattened stream of water which issues from said nozzle 36. This stream will also, to a certain extent, move any fish which may lie in the pockets longitudinally thereof in a direction lengthwise of said pockets. The next streams of water which are delivered to the pockets and against the fish are delivered by the nozzles 37 and 38 through the slots 44 and 45 respectively. These peculiar V-shaped flattened streams of water move the fish longitudinally of the pockets in which they are located and if one fish is lying on top of another, these V-shaped streams get underneath the fish and lift them so as to assist in the longitudinal movement of the fish for the purpose of bringing the heads thereof against the gages at opposite ends of the pockets, and, moreover, the streams issuing from the slots 44 and 45, being wide, will follow the fish as the carrier moves, so that the stream is not directed momentarily against the fish, but is directed against the fish while the pocket is moved from one end of the V-shaped slot to the other. Thus the water has a chance to play upon the fish for a comparatively longer period than would be the case if the stream issued from a round nozzle, and it must be borne in mind that the fish must be moved by a stream of water which continually plays upon the fish to as great an extent as possible while the carrier is moving. The result obtained by a continued stream acting upon the fish as the pockets move by, is much more beneficial as to the placing of the fish with his head against the gage than would be the case if a more powerful stream were played upon the fish for a shorter period of time. As the carrier now moves forward in the direction of the arrow thereon, the pockets next come beneath the streams of water issuing from the V-shaped slots 46 and 47 in the nozzles 39 and 40. These slots, as will be noted, are placed nearer the center of the pockets and also are located at different angles from the slots 44 and 45, and thus fish which have been partly moved by the streams issuing from the slots 44 and 45 are moved still farther by the flattened V-shaped streams issuing from the slots 46 and 47 to bring the noses of the fish against the gages at the opposite ends of the pockets, and after the carrier has moved still farther, the pockets will be moved beneath the V-shaped stream issuing from the slot 48 in the nozzle 41, and this stream, playing into the moving pockets, produces a two-fold result, viz., it holds such fish as are already positioned with their noses against the gages and it completes the positioning of such fish as are not properly positioned by moving them until their noses are against the gages. The entire action of the water upon the fish in the pockets up to this point is to move and position all of the fish in each pocket so that each and every fish in the pockets shall be reached and gently moved or lifted and moved in the direction in which his head is pointing, so that it will be positioned at the end of the pocket with his nose resting finally against one of the gages. The shape of the fish, the scales and the gills all aid in giving a line of least resistance, which is one of the reasons why the fish will move head first instead of tail first in the water in the pockets. The two diverging streams issuing from the slots 49, 49 in the nozzle 42 serve to keep the fish with their noses against the gages prior to the time when they pass beneath the shield 51. As the fish pass downwardly in the pockets adjacent to the shield 51, they fall against said shield and are pushed along by the partitions in the pockets until they arrive at the cutters 54, when the heads and tails are severed therefrom and pass down the chutes 59, the bodies of the fish passing down the chute 57 into the chute 58 which conveys them away to any desired location or to any desired receptacle.

For different size fish and fish of different conditions it is sometimes desirable to change the angle which the slots at the ends of the outlets bear to the pockets, and this can be readily attained by twisting the nozzles upon their respective pipes to which they are screw-threaded. It will be noted, therefore, that the fish are positioned in the pockets, with their heads against the gages, by a plurality of streams of water issuing from nozzles which are adjacent to the periphery of the carrier, that these streams of water are delivered in flattened streams, by reason of the outlets of the nozzles being slotted, and that, by the placing of these V-shaped or flattened streams in different positions, the stream of water will follow the fish, as it were, from the time that he arives beneath one end of the slotted stream until he passes beyond the other end of said slotted stream.

It will be understood that instead of the slotted outlet of the nozzle, an outlet might be made of a series of holes not connected with each other but close together, forming a line of holes, which would be equivalent to the slot hereinbefore described, but which would not be so desirable for the reason that said holes would be liable to clog up with dirt and thus cause trouble.

It will be understood that by means of the mechanism hereinbefore described the fish are located with their noses against the gages 52 or 53, as the case may be, and when the fish are long enough the heads and tails will be cut off simultaneously by the same operation by means of the pair of rotary cutters 54. In certain cases, however, where the fish is short or small and the tail is not long enough to extend into the path of one rotary cutter, the other rotary cutter will operate to sever the head from the body. Practically, however, the short fish which are thus operated upon to sever the head only, would form but a small proportion of the fish cut in a certain size cutting machine and are used and packed without the tail being severed therefrom.

Having thus described my invention, what I claim and desire by Letters Patent to secure is:

1. A fish cutting machine having, in combination, a fish carrier movable in a given direction, pockets in said carrier extending transversely of said carrier and of the direction of movement of said carrier and means, consisting of a water conveyer, having an outlet orifice elongated transversely thereof and adapted to direct a flattened stream of water into said pockets at an angle to the length of said pockets.

2. A fish cutting machine having, in combination, a fish carrier movable in a given direction, pockets in said carrier extending transversely of said carrier and of the direction of movement of said carrier and means, consisting of a water conveyer, having an outlet orifice constituting a slot and adapted to direct a flattened stream of water into said pockets at an angle to the length of said pockets.

3. A fish cutting machine having, in combination, a fish carrier movable in a given direction, pockets in said carrier extending transversely of said carrier and of the direction of movement of said carrier and means consisting of a water conveyer having an outlet orifice constituting a V-shaped slot and adapted to deliver a V-shaped stream of water into said pockets at an angle to the length of said pockets.

4. A fish cutting machine having, in combination, a fish carrier movable in a given direction, pockets in said carrier extending transversely of said carrier and of the direction of movement of said carrier and means consisting of a water conveyer having an outlet orifice elongated transversely thereof and adapted to direct a flattened stream of water into said pockets at an angle to the length of said pockets, and means to set that portion of said water conveyer containing said elongated orifice at different angles relatively to said pockets.

5. A fish cutting machine having, in combination, a fish carrier movable in a given direction, pockets in said carrier extending transversely of said carrier and of the direction of movement of said carrier and a plurality of water conveyers, each having an outlet orifice constituting a slot adapted to direct a plurality of flattened streams of water into said pockets at an angle to the length of said pockets, said slots arranged at different angles relatively to each other.

6. A fish cutting machine having, in combination, a fish carrier movable in a given direction, pockets in said carrier extending transversely of said carrier and of the direction of movement of said carrier and a plurality of water conveyers, each having an outlet orifice constituting a slot adapted to direct a plurality of flattened streams of water into said pockets at an angle to the length of said pockets, said slots arranged at different angles relatively to said pockets.

7. A fish cutting machine having, in combination, a fish carrier movable in a given direction, pockets in said carrier extending transversely of said carrier and of the direction of movement of said carrier and a plurality of water conveyers, each having an outlet orifice constituting a slot adapted to direct a plurality of flattened streams of water into said pockets at an angle to the length of said pockets, said slots located in different positions relatively to the ends of said pockets.

8. A machine for handling fish having, in combination, a rotary carrier provided with pockets in its periphery, partitions on said carrier separating said pockets from each other and extending longitudinally of said carrier, a cutter projecting into said pockets transversely thereof, said partitions having slots therein in alinement with said cutter and means to feed fish to said pockets consisting of a rotary segregator having a series of pockets adjacent to the periphery thereof, radially disposed walls separating said pockets from each other, a shield adjacent to and extending part way around the periphery of said segregator and terminating at one end thereof near the bottom of said segregator, a guide interposed between said segregator and carrier and adapted to guide fish from said segregator to the pockets in said carrier and means adapted to deliver fish to said segregator pockets at the inner ends thereof.

9. A machine for handling fish having, in combination, a rotary carrier provided with pockets in its periphery, partitions on said carrier separating said pockets from each other and extending longitudinally of said carrier, a cutter projecting into said pockets transversely thereof, said partitions having slots therein in alinement with said cutter and means to feed fish to said pockets consisting of a rotary segregator having a series of pockets adjacent to the periphery thereof, radially disposed walls of an ogee curvature separating said pockets from each other, a shield adjacent to and extending part way around the periphery of said segregator and terminating at one end thereof near the bottom of said segregator, a guide interposed between said segregator and carrier and adapted to guide fish from said segregator to the pockets in said carrier, means to push said fish along said guide into said pockets and means adapted to deliver fish to said segregator pockets at the inner ends thereof.

10. A machine for handling fish having, in combination, a rotary carrier provided with pockets in its periphery, partitions on said carrier separating said pockets from each other and extending longitudinally of said carrier, a cutter projecting into said pockets transversely thereof, said partitions having slots therein in alinement with said cutter and means to feed fish to said pockets consisting of a rotary segregator having a series of pockets adjacent to the periphery thereof, radially disposed walls separating said pockets from each other, a shield adjacent to and extending part way around the periphery of said segregator and terminating at one end thereof near the bottom of said segregator, a guide interposed between said segregator and carrier and adapted to guide fish from said segregator to the pockets in said carrier and a rotary feed member located beneath said guide and provided with fingers adapted to project through slots in said guide and engage fish thereon to push said fish along said guide and into the pockets on said carrier.

11. A machine for handling fish having, in combination, a rotary carrier provided with pockets in its periphery, partitions on said carrier separating said pockets from each other and extending longitudinally of said carrier, a cutter projecting into said pockets transversely thereof, said partitions having slots therein in alinement with said cutter and means to feed fish to said pockets consisting of a rotary segregator having a series of pockets adjacent to the periphery thereof, radially disposed walls separating said pockets from each other, a shield adjacent to and extending part way around the periphery of said segregator and terminating at one end thereof near the bottom of said segregator, a guide interposed between said segregator and carrier and adapted to guide fish from said segregator to the pockets in said carrier and means consisting of a V-shaped conductor adapted to deliver fish to said segregator pockets longitudinally of said pockets and at the inner ends thereof.

12. In a machine for handling fish, a rotary segregator having a series of pockets in its periphery adapted to receive fish, radially disposed walls of an ogee curvature separating said pockets from each other and means to deliver fish to said pockets longitudinally of said pockets and at the inner ends thereof.

13. A fish cutting machine having, in combination, a fish carrier movable in a given direction, pockets in said carrier extending transversely of said carrier and of the direction of movement of said carrier, means, consisting of a water conveyer having an outlet orifice elongated transversely thereof and adapted to direct a flattened stream of water into said pockets at an angle to the length of said pockets, a pair of rotary cutters projecting into said pockets transversely thereof and means to impart a rotary motion to said cutters.

14. A fish cutting machine having, in combination, a fish carrier movable in a given direction, pockets in said carrier extending transversely of said carrier and of the direction of movement of said carrier, partitions on said carrier separating said pockets from each other and extending longitudinally of said carrier, a cutter projecting into said pockets transversely thereof, said partitions having slots therein in alinement with said cutter and means consisting of a water conveyer having an outlet orifice elongated transversely thereof and adapted to direct a flattened stream of water into said pockets at an angle to the length of said pockets.

15. A fish cutting machine having, in combination, a fish carrier movable in a given direction, pockets in said carrier extending transversely of said carrier and of the direction of movement of said carrier, a pair of cutters projecting into said pockets transversely thereof, means to impart a rotary motion to said cutters annular gages at opposite ends, respectively, of said pockets and a water conveyer having an outlet orifice elongated transversely thereof and adapted to direct a flattened stream of water into said pockets at an angle to the length of said pockets.

16. A fish cutting machine having, in combination, a fish carrier movable in a given direction, pockets in said carrier extending transversely of said carrier and of the direction of movement of said carrier, a pair of rotary cutters projecting into said pockets transversely thereof, means to impart a rotary motion to said cutters, gages at opposite ends, respectively, of said pockets, a semicircular shield adjacent to the periphery of said carrier and means located in advance of said cutters and consisting of a plurality of water conveyers, each having an outlet orifice, constituting a slot, adapted to direct a plurality of flattened streams of water into said pockets at an angle to the length of said pockets.

In testimony whereof I have hereunto set my hand in presence of two subscribing witnesses.

FRANCIS D. CLEVELAND.

Witnesses:
CHARLES S. GOODING,
SYDNEY E. TAFT.